United States Patent [19]

Onan et al.

[11] Patent Number: 5,057,814
[45] Date of Patent: Oct. 15, 1991

[54] ELECTRICAL MALFUNCTION DETECTION SYSTEM

[75] Inventors: Lance C. Onan, Wauwatosa; James Scholler, Brookfield; Douglas E. Stehr, Hales Corners; Hugh R. Putnam, Milwaukee, all of Wis.

[73] Assignee: Harley-Davidson, Inc., Milwaukee, Wis.

[21] Appl. No.: 383,728

[22] Filed: Jul. 24, 1989

[51] Int. Cl.⁵ .............................................. B60Q 11/00
[52] U.S. Cl. .................................... 340/458; 307/10.8; 315/82; 315/130; 340/641; 340/642
[58] Field of Search ...................... 340/458, 641, 642; 307/10.8; 315/82, 129, 130

[56] References Cited

U.S. PATENT DOCUMENTS

| | | | |
|---|---|---|---|
| 3,604,949 | 9/1971 | Conzelmann et al. | 340/458 |
| 4,150,359 | 4/1979 | Mizuno et al. | 340/642 |
| 4,291,302 | 9/1981 | King et al. | 340/458 |
| 4,518,963 | 5/1985 | Rogers, Jr. | 340/642 |
| 4,745,339 | 5/1988 | Izawa et al. | 340/642 |
| 4,811,010 | 3/1989 | Lucas | 340/642 |
| 4,972,174 | 11/1990 | Onan et al. | 340/476 |

Primary Examiner—Donnie L. Crosland
Assistant Examiner—Brent A. Swarthout
Attorney, Agent, or Firm—Whyte & Hirschboeck

[57] ABSTRACT

A protection system has a power supply connected to lamps by a low value resistor. The resistor is part of a voltage divider system which provides input signals to a number of comparators. These comparators provide appropriate signals to a microprocessor to indicate normal operation. When a malfunction is detected, the voltage drop across the low value resistor changes and alters the output of the comparators. The microprocessor thereafter produces an appropriate warning signal. In a vehicle turn signal circuit, the present invention is incorporated to detect a burned out bulb. A warning is provided to the vehicle operator when a bulb is out. Further, pursuant to federal safety regulations, the remaining functioning bulbs, when activated, flash at a substantially slower rate.

23 Claims, 3 Drawing Sheets

ELECTRICAL MALFUNCTION DETECTION SYSTEM

CROSS-REFERENCES TO RELATED APPLICATIONS

This application is being filed simultaneously with the application co-owned by the applicant entitled "Motorcycle Turn Signal Control Circuit", U.S. Ser. No. 07/383,025, filed on July 21, 1989, issued Nov. 20, 1990 as U.S. Pat. No. 4,972,174.

BACKGROUND OF THE INVENTION

1. Field of the Invention

The present invention relates generally to electrical systems in which malfunctions are to be detected. More particularly, the present invention relates to electrical systems wherein an operator or other person is to be warned or notified of a system malfunction. Even more particularly, the present invention relates to detection of a condition such as a malfunction in a device which affects the current flow from a source of electric power to the device. Application to a vehicle turn signal system is specifically illustrated.

2. Description of Related Areas of Art

The present invention relates to an electrical malfunction detector. In earlier devices of this type developed to address the situation, electromechanical devices have been used to change the operation of the system in order to comply with legal and common sense safety standards and practices. For example, bimetallic springs which physically behave differently when an element is malfunctioning have been used along with a device having contacts attached through the spring. Such devices require proper mechanical operation of the device as well as electrical operation. These are shortcomings particularly apparent in "bulb out" detection systems in vehicles where it is desirable to detect and alert a vehicle operator of a turn signal bulb burnout.

Applicant is unaware of any prior detection system being purely electrical and not using any such mechanical or electromechanical devices. Therefore, a purely electrical detection system would prove to be a significant advancement in the art.

OBJECTS AND SUMMARY OF THE INVENTION

It is an object of the present invention to provide a malfunction detection system which does not utilize mechanical or electromechanical devices.

It is another object of the present invention to provide a detection system which is readily adaptable to a number of electrical systems.

It is a further object of the present invention to provide a system adaptable to be used as a "bulb out" detection system on vehicles having turn signals.

How these and other objects of the present invention are accomplished will be described by reference to the following description of the preferred embodiment of the invention taken in conjunction with the Figures. Generally, however, the objects are accomplished in a detection system having a power supply connected to the area to be monitored by a low value resistor. The resistor is part of a voltage divider system which provides input signals to a number of comparators. These comparators provide appropriate signals to a microprocessor to indicate normal operation when the bulb system is operating correctly. When a malfunction is detected, the voltage drop across the low value resistor changes and alters the output of the comparators. The microprocessor thereafter produces an appropriate warning signal to alert the operator or other person that the equipment is operating improperly.

In a vehicle's turn signal circuitry, the present invention is incorporated to detect a burned out bulb. An indication or warning is provided to the vehicle operator when a bulb is out. Further, pursuant to federal safety regulations, the remaining functioning bulbs, when activated, flash at a substantially slower rate.

Other variations, modifications and applications of the invention will become apparent to those presently of ordinary skill in the art after reading the specification and are deemed to fall within the scope of the present invention if they fall within the scope of the claims which follow the description of the preferred embodiment.

DESCRIPTION OF THE DRAWINGS

In the Figures, like reference numerals refer to like components.

DESCRIPTION OF THE PREFERRED EMBODIMENT

General System Description

Figure 1:
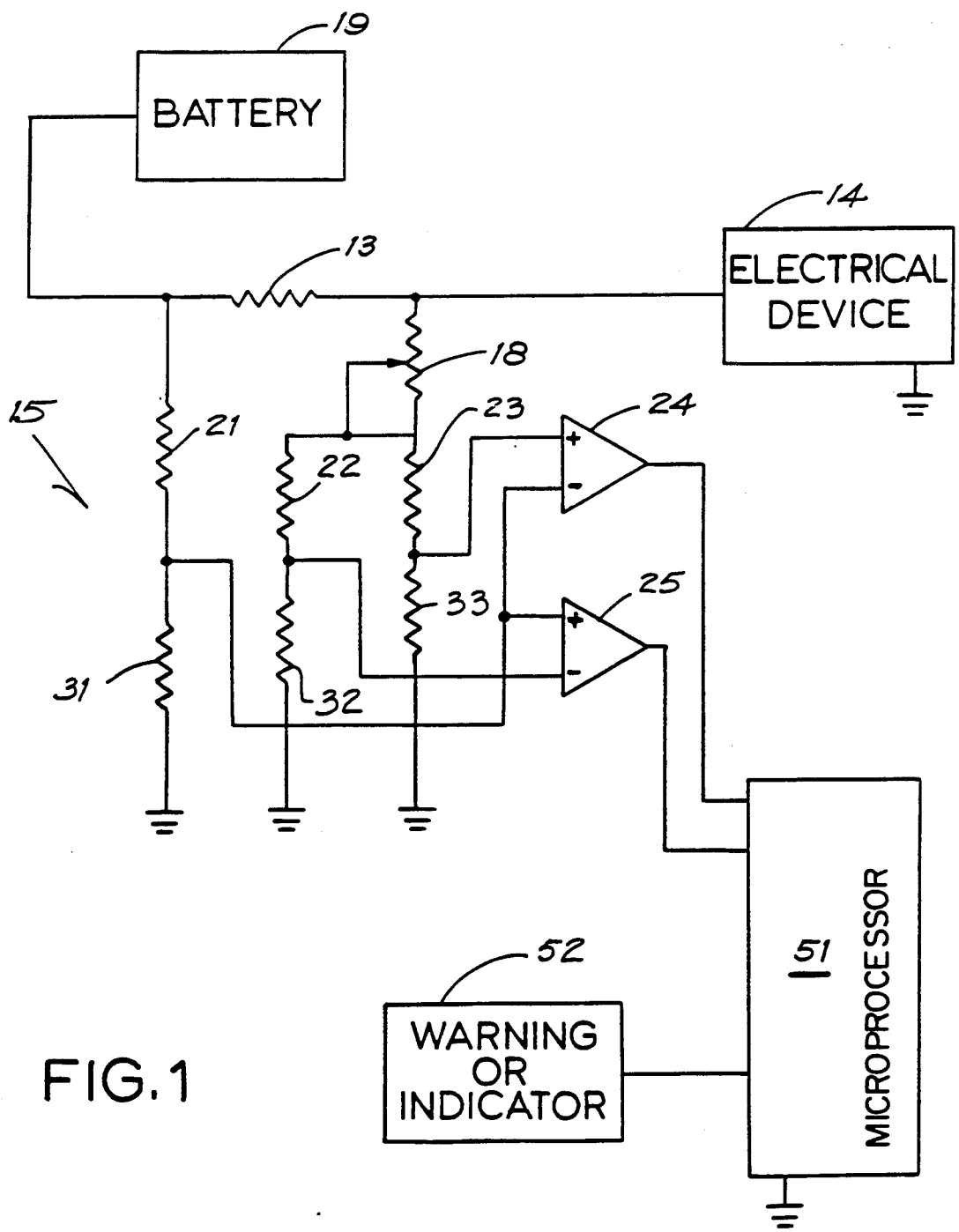
FIG. 1 is a schematic of the present invention.

FIG. 1 shows a general configuration of the preferred embodiment of the present invention. The system is powered by a source of electricity such as a battery 19. An electrical device 14 is connected to battery 19 via circuit 15.

The circuit 15 includes a low value resistor 13 in series with battery 19 and device 14. The remainder of circuit 15 is connected across resistor 13. The specific operating parameters of circuit 15 are set with variable resistor 18. Resistor pairs 21, 31; 22, 32; 23, 33 work in conjunction with resistors 13 and 18 to provide comparators 24 and 25 with voltage signals representative of the current flow through resistor 13. Selection of values for resistor 18 and the other resistors 21, 22, 23, 31, 32, 33 permits detection of three categories of values. When the voltage drop across (i.e. current flow through) resistor 13 is below a preselected minimum value, a first output signal is generated by comparators 24, 25. Similarly, when the voltage drop across (current flow through) resistor 13 is greater than a preselected maximum, comparators 24, 25 generate the first output signal.

When the voltage drop across resistor 13 is within the preselected minimum and maximum, comparators 24 and 25 generate a different output signal. So long as this signal is being received by microprocessor 51, operation of device 14 continues. However, when microprocessor 51 receives the first output signal from comparators 24, 25, a warning or indicator 52 is activated to warn of a malfunction in device 14. In some cases, microprocessor 51 can also be programmed to shut down or alter operation of device 14 for safety or other reasons.

The above-described detection system will now be described as applied to a vehicle turn signal system. In such a system, circuitry similar to circuit 15 is used to detect, among other things, a burned out turn signal bulb.

Configuration of "Bulb Out" Detector Embodiment

Figure 2:
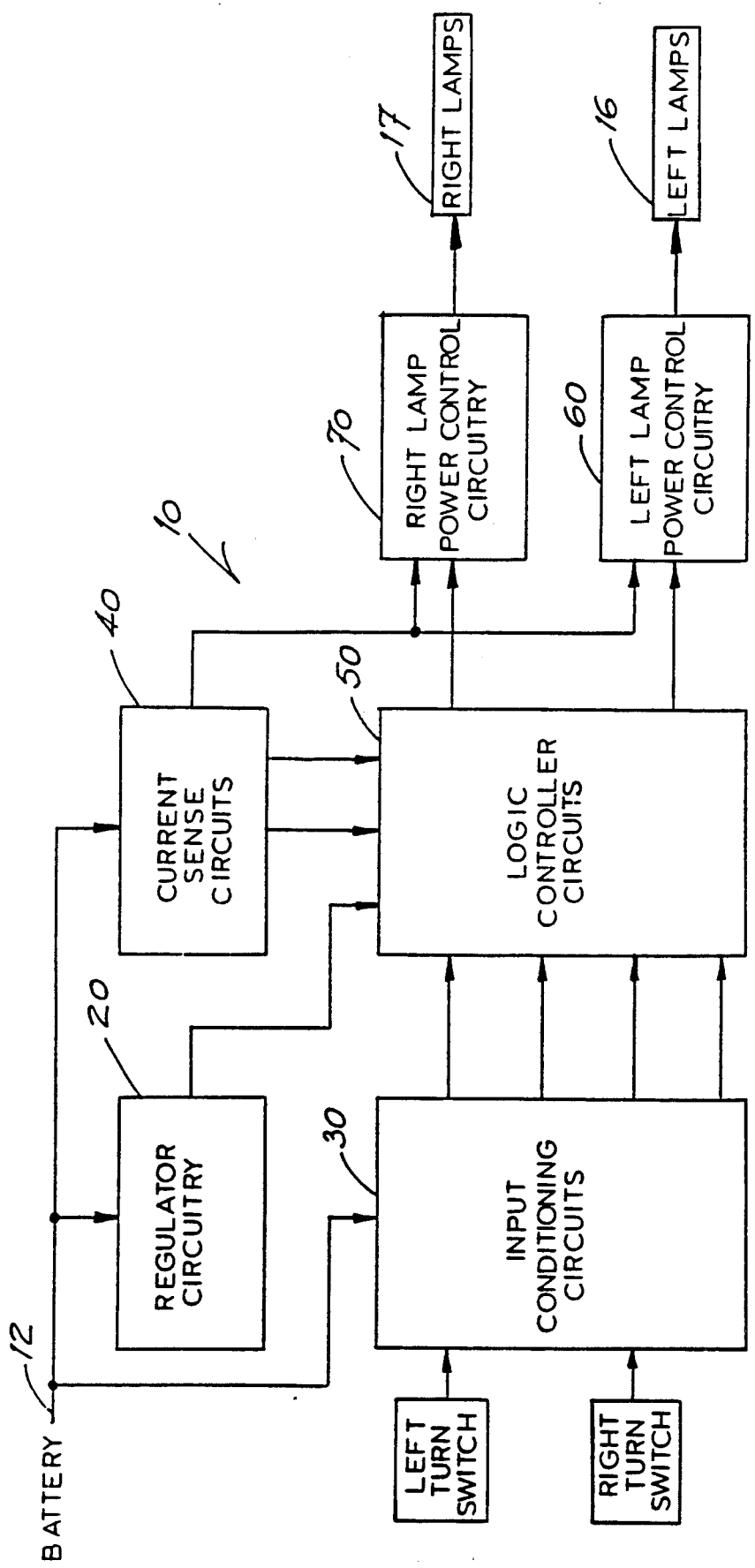
FIG. 2 is a block schematic diagram of the turn signal bulb out system of the present invention.

A block schematic diagram of the present invention incorporated in a turn signal "bulb out" detector is shown in FIG. 2. The circuit 10 is powered by a battery via line 12. Turn signal switches 6, 7 are provided for the vehicle operator to indicate an intention to turn, change lanes, etc. The signals are displayed by left lamps 16 and right lamps 17.

Figure 3:
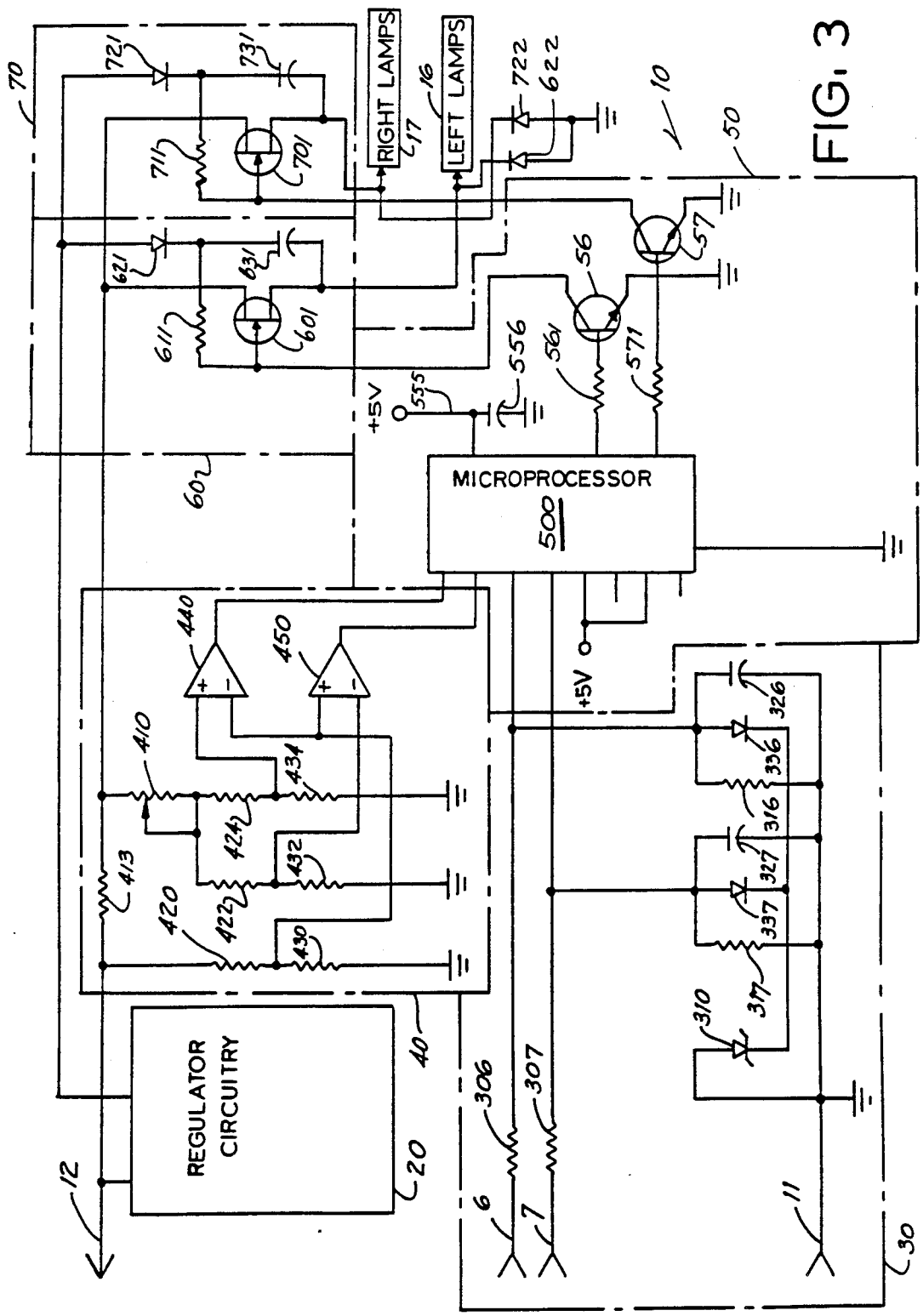
FIG. 3 is an electrical schematic of the turn signal bulb out system of the present invention.

Required operating voltages are established in the regulator circuitry 20 to run other components of circuit 10. Similarly, input signals on lines 6 and 7 are appropriately conditioned for the logic controller circuits 50 in conditioning circuitry 30. As seen in FIG. 3, conditioning circuitry 30 uses resistor pair 306, 316 on line 6 and resistor pair 307, 317 on line 7 to bias down lines 6 and 7. Capacitor-diode pairs 326, 336 and 327, 337 clamp voltages on lines 6 and 7, respectively, along with zener diode 310, to prevent damage to circuits 50 which are voltage-sensitive semiconductors in the preferred embodiment.

Current sense circuits 40 are used to detect burned out directional signal lamps. This is accomplished by monitoring the current flow to the right lamp control circuitry 60 and left lamp control circuitry 70, each of which controls the front and rear turn signal lamps on its respective side. Current sense circuits 40 also shut down circuit 10 if the current flow is too high. Circuits 40 thus establish a current "window" in which circuit 10 operates. The parameters of the window are controlled by variable resistor 410.

Resistor 413 acts as a low value resistor at which a voltage drop is measured to detect changes in current flow. Variable resistor 410 works with resistor pairs 420, 430; 422, 432; 424, 434 to provide input voltages to comparators 440, 450. Use of the output signals from comparators 440, 450 will be discussed in more detail below.

Data from the input conditioning circuits 30 and the current sense circuits 40 are transmitted to the logic controller circuits 50 where circuit 10 decides what, if any, functions to perform. The heart of logic controller 50 is a microprocessor 500 receiving signals representative of the current flow to the right and left lamps 17, 16 generated by comparators 440, 450. In the preferred embodiment, microprocessor 500 is powered through line 555 which uses capacitor 556 as a noise filter.

Output signals (pulses) from the microprocessor 500 are sent via resistor 561 to turn on transistor 56, thereby turning on the right lamp power control circuitry 60. Similarly, output signals (pulses) are sent through resistor 571 to turn on transistor 57 and left lamp power control circuitry 70.

In the preferred embodiment, right lamp power control circuitry 70 uses a voltage activated MOSFET transistor 701, resistor 711, diodes 721, 722 and capacitor 731 configured as shown in FIG. 3 so that when transistor 57 is turned on, transistor 701 is conducting and turns on the right lamps 17 in a manner and for a time period determined by the programming of microprocessor 500. Similarly, left lamp power control circuitry 60 uses a voltage activated MOSFET transistor 601, resistor 611, diodes 621, 622 and capacitor 631. These components are configured so that when transistor 56 is turned on, transistor 601 conducts, lighting the left lamps 16, again in a manner and for a time period determined by the programming of microprocessor 500.

Again, the entire circuit 10 operates without the use or need of mechanical switches or electromechanical devices such as relays, mercury switches or bimetallic springs. The programming of microprocessor 500 and operation of circuit 10 will now be described in relation to the above-described circuit configuration.

Operation of the "Bulb Out" Detector Embodiment

The operation of circuit 10 is based primarily on the signals generated by comparators 440, 450 and processed by microprocessor 500. When no bulbs are burned out, the system operates normally, displaying signals for left and right turns and emergency four-way flashing at a given flashing rate. When one or more of the lamp bulbs burns out, it is necessary to warn the vehicle operator. Federal safety standards also require that if a lamp bulb burns out, the turn signals must flash at a substantially slower rate. Current sense circuits 40 will detect the change in the voltage drop across and, therefore, current flow through low value resistor 413 due to an open circuit present in left lamp 16 or right lamp 17. Such a change in voltage drop will cause the output of comparators 440, 450 to change. This alters the signal to microprocessor 500.

A preselected change in input to the microprocessor 500 from comparators 440, 450 slows down the frequency of pulses sent to turn on either transistor 56 or transistor 57 to thereby slow down the lamp flashing rate. Additionally, a visual and/or audio warning can be provided to the operator. For example, a dashboard indicator light, which usually flashes when any of the turn signal lamps is being used, can be turned on to provide a steady light rather than flashing.

This solid state "bulb out" detection system avoids the use of mechanical or electromechanical devices, such as bimetallic springs, which have been used in the past. A purely electrical system is used instead.

Variations, modifications and other applications will become apparent to those presently of ordinary skill in the art. Therefore, the above description of the preferred embodiment is to be interpreted as illustrative rather than limiting. The scope of the present invention is limited only by the scope of the claims which follow.

What is claimed is:

1. A detection system comprising:
   a) a power source supplying electricity to a device;
   b) a first resistor in series between said source and said device, said first resistor being connected to said source at a first junction and being connected to said device at a second junction;
   c) voltage divider means connected across said first resistor;
   d) comparator means, connected to said voltage divider means, for continuously comparing the current flow through said first resistor to a preselected range of current flows, said comparator means comprising
      a first comparator having one input connected via said voltage divider means to said first junction and having another input connected via said voltage divider means to said second junction and wherein said first comparator generates a first output signal indicative of whether the current flow through said first resistor is below the minimum of said range, and a second comparator having one input connected via said voltage divider means to said first junction and having another input connected via said voltage divider means to said second junction and wherein said second comparator generates a second output signal indicative of whether the current flow through said first resistor is above the maximum of said range; and e) means for indicating when the current flow through said first resistor is outside said preselected range of current flow values.

2. The system of claim 1 wherein said comparator means further comprises means for processing said output signals and generating a third output signal to said indicating means when the current flow through said first resistor is outside said preselected range.

3. The system of claim 2 wherein said voltage divider mean is adjustable.

4. The system of claim 3 wherein said voltage divider means comprises a plurality of resistors, including a variable resistor.

5. The system of claim 4 wherein said first resistor has a low resistance.

6. The system of claim 5 wherein said indicating means is a light.

7. The system of claim 5 wherein said indicating means includes means for turning off said device.

8. A detection system for a vehicle having turn signals using light bulbs, said system comprising:

a) a light bulb connected to a source of electricity;
b) means for generating a voltage drop, in series between said bulb and said source, said generating means being connected to said source at a first junction and being connected to said bulb at a second junction;
c) means for measuring the voltage drop;
d) means connected to said voltage drop measuring means for comparing the voltage drop to a preselected range of voltage drop values, said comparing means comprising a first comparator having one input connected to said first junction and having another input connected to said second junction and wherein said first comparator generates a first output signal indicative of whether the voltage drop across said generating means is below the minimum of said range, and a second comparator having one input connected to said first junction and another input connected to said second junction and wherein said second comparator generates a second output signal indicative of whether the voltage drop across said generating means is above the maximum of said range; and
e) means connected to said comparing means for indicating when the measured voltage drop is outside said preselected range.

9. The system of claim 8 wherein said voltage drop measuring means comprises a first resistor.

10. The system of claim 9 wherein said voltage drop measuring means comprises a voltage divider means connected across said first resistor.

11. The system of claim 10 wherein said comparing means further comprises means for processing said first and second signals to generate a third output signal to said indicating means indicative of whether the measured voltage drop falls within said preselected range.

12. The system of claim 11 wherein said voltage divider means is adjustable.

13. The system of claim 12 wherein said voltage divider means comprises a plurality of resistors including a second, variable resistor.

14. The system of claim 13 wherein said indicating means includes means for causing said bulb to flash at a preselected rate.

15. The system for claim 13 wherein said indicating means includes means for warning an operator of the vehicle.

16. The system of claim 8 wherein the vehicle is a motorcycle.

17. The system of claim 16 wherein said voltage drop measuring means comprises a first resistor.

18. The system of claim 17 wherein said voltage drop measuring means comprises a voltage divider means connected across said first resistor.

19. The system of claim 18 wherein said comparing means further comprises means for processing said first and second signals to generate a third output signal to said indicating means indicative of whether the measured voltage drop falls within said preselected range.

20. The system of claim 19 wherein said voltage divider means is adjustable.

21. The system of claim 20 wherein said voltage divider means comprises a plurality of resistors including a second, variable resistor.

22. The system of claim 21 wherein said indicating means includes means for causing said bulb to flash at a preselected rate.

23. The system for claim 21 wherein said indicating means includes means for warning an operator of the vehicle.

* * * * *